United States Patent
Tsai et al.

(10) Patent No.: US 11,695,310 B2
(45) Date of Patent: Jul. 4, 2023

(54) MOTOR, COOLING DEVICE HAVING TWISTED SPIRAL COOLING CHANNEL AND COOLING METHOD

(71) Applicant: NATIONAL CHENG KUNG UNIVERSITY, Tainan (TW)

(72) Inventors: Mi-Ching Tsai, Tainan (TW); Shyy-Woei Chang, Kaohsiung (TW); Min-Fu Hsieh, Tainan (TW); Kai-Jung Shih, Tainan (TW); Wei-Ling Cai, Pingtung County (TW); Jen-Hsiang Liu, Taichung (TW)

(73) Assignee: National Cheng Kung University, Tainan (TW)

( * ) Notice: Subject to any disclaimer, the term of this patent is extended or adjusted under 35 U.S.C. 154(b) by 183 days.

(21) Appl. No.: 17/106,708

(22) Filed: Nov. 30, 2020

(65) Prior Publication Data
US 2021/0328477 A1 Oct. 21, 2021

(30) Foreign Application Priority Data

Apr. 15, 2020 (TW) .................................. 109112683

(51) Int. Cl.
*H02K 5/20* (2006.01)
*H02K 9/19* (2006.01)

(52) U.S. Cl.
CPC ................. *H02K 5/20* (2013.01); *H02K 9/19* (2013.01)

(58) Field of Classification Search
CPC .. H02K 9/16; H02K 9/19; H02K 9/18; H02K 9/197; H02K 9/20; H02K 9/06; H02K 9/14; H02K 1/193; H02K 1/32; H02K 1/20; H02K 5/20; H02K 5/02; H02K 5/04; H02K 5/08; H02K 41/031
See application file for complete search history.

(56) References Cited

U.S. PATENT DOCUMENTS

2016/0141921 A1* 5/2016 Kubes ...................... H02K 9/19
228/110.1

FOREIGN PATENT DOCUMENTS

CN 208174422 U 11/2018
TW I413349 B 10/2013

* cited by examiner

*Primary Examiner* — Bryan R Perez
(74) *Attorney, Agent, or Firm* — Rosenberg, Klein & Lee

(57) ABSTRACT

A motor, a cooling device, and a cooling method are disclosed. The cooling device is mounted on a stator of the motor. The cooling device includes a sleeve and a spiral duct. A wall of the sleeve has a spiral groove extending along the sleeve. The sleeve is sleeved onto the stator. The spiral duct is mounted in the spiral groove. The spiral duct has a first spiral form corresponding to the spiral groove, so that the spiral duct is correspondingly installed in the spiral groove. The spiral duct has a second spiral form extending along the spiral duct. A twisted spiral cooling channel is formed along the spiral pathway. A cooling fluid flowing through the twisted spiral cooling channel is subjected to the continuously changing cross-section of the twisted spiral cooling channel to enhance the swirl intensity, thereby improving the convection heat transfer effectiveness.

11 Claims, 10 Drawing Sheets

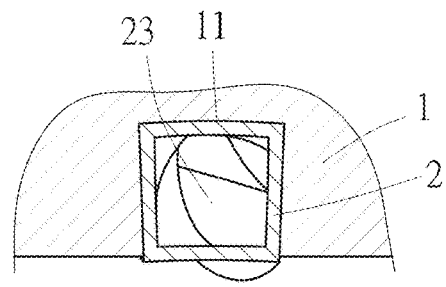
F I G . 3A
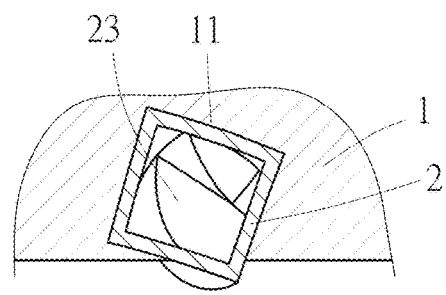
F I G . 3B
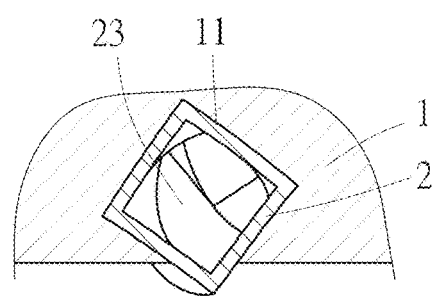
F I G . 3C
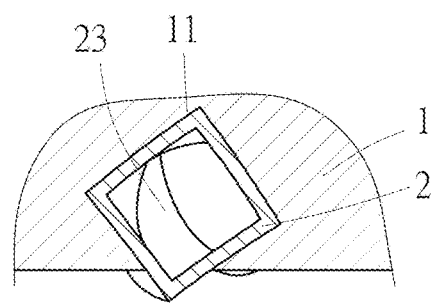
F I G . 3D

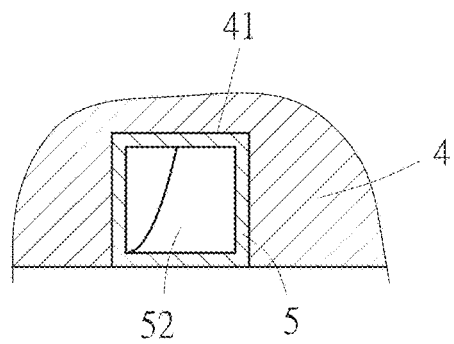
F I G . 6A
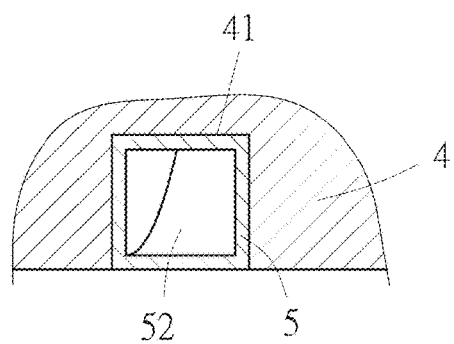
F I G . 6B
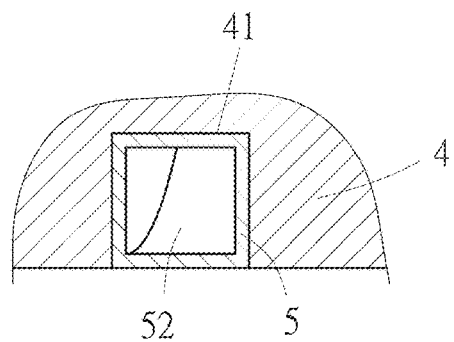
F I G . 6C
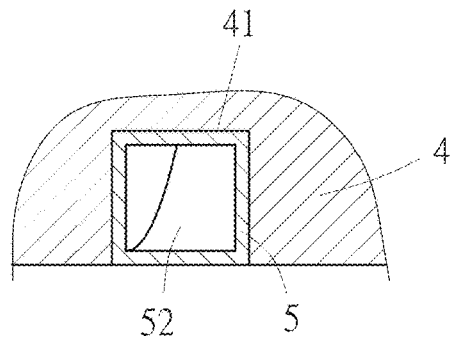
F I G . 6D

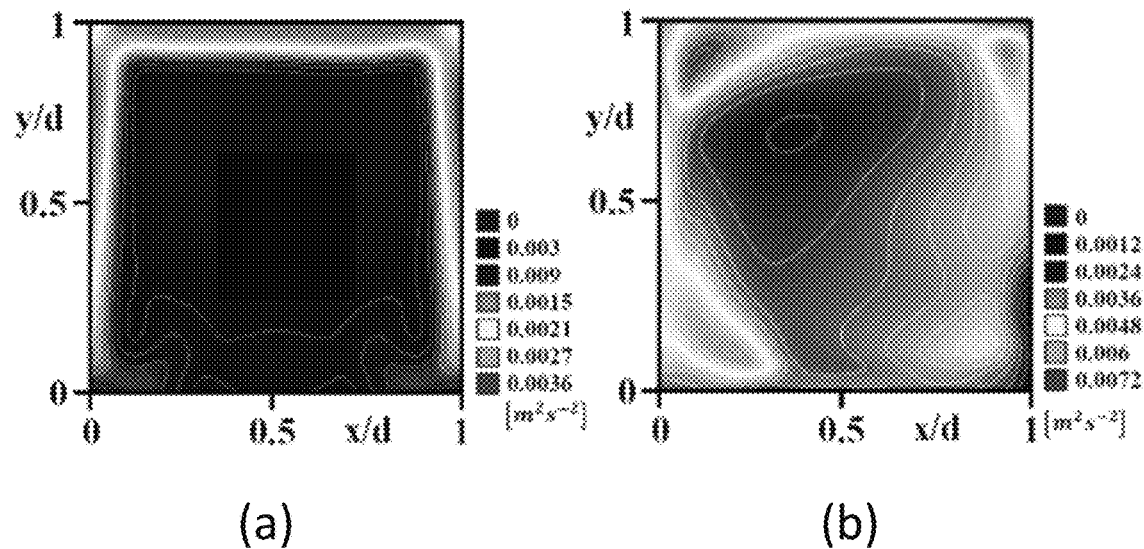
(a) (b)
F I G . 9
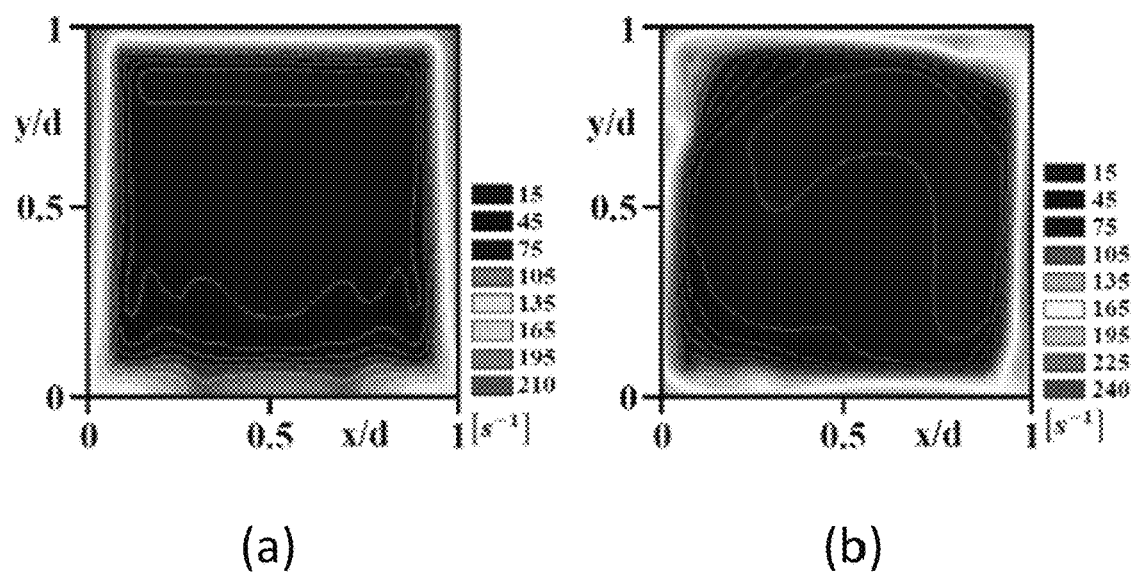
(a) (b)
F I G . 10

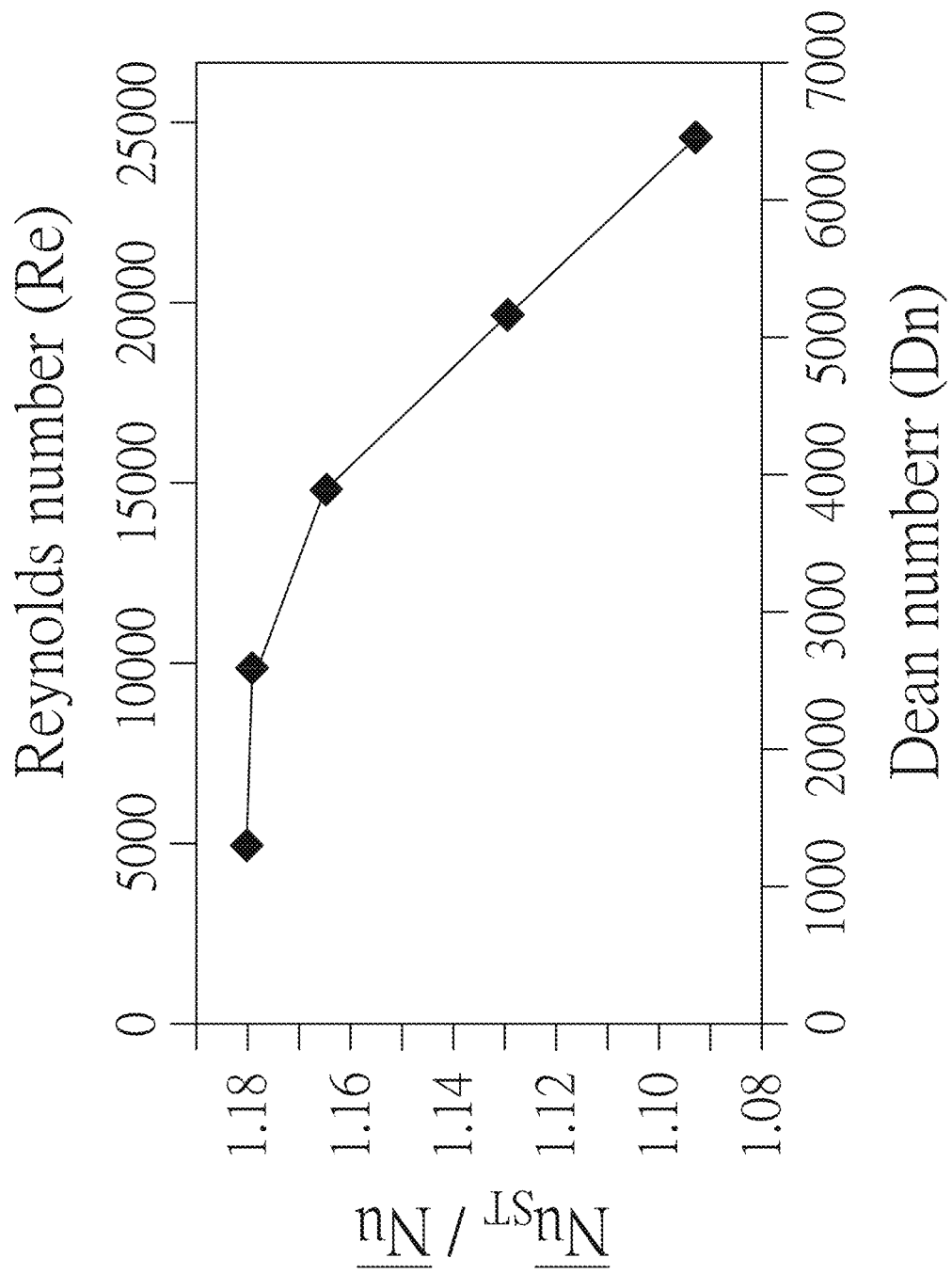
F I G. 11

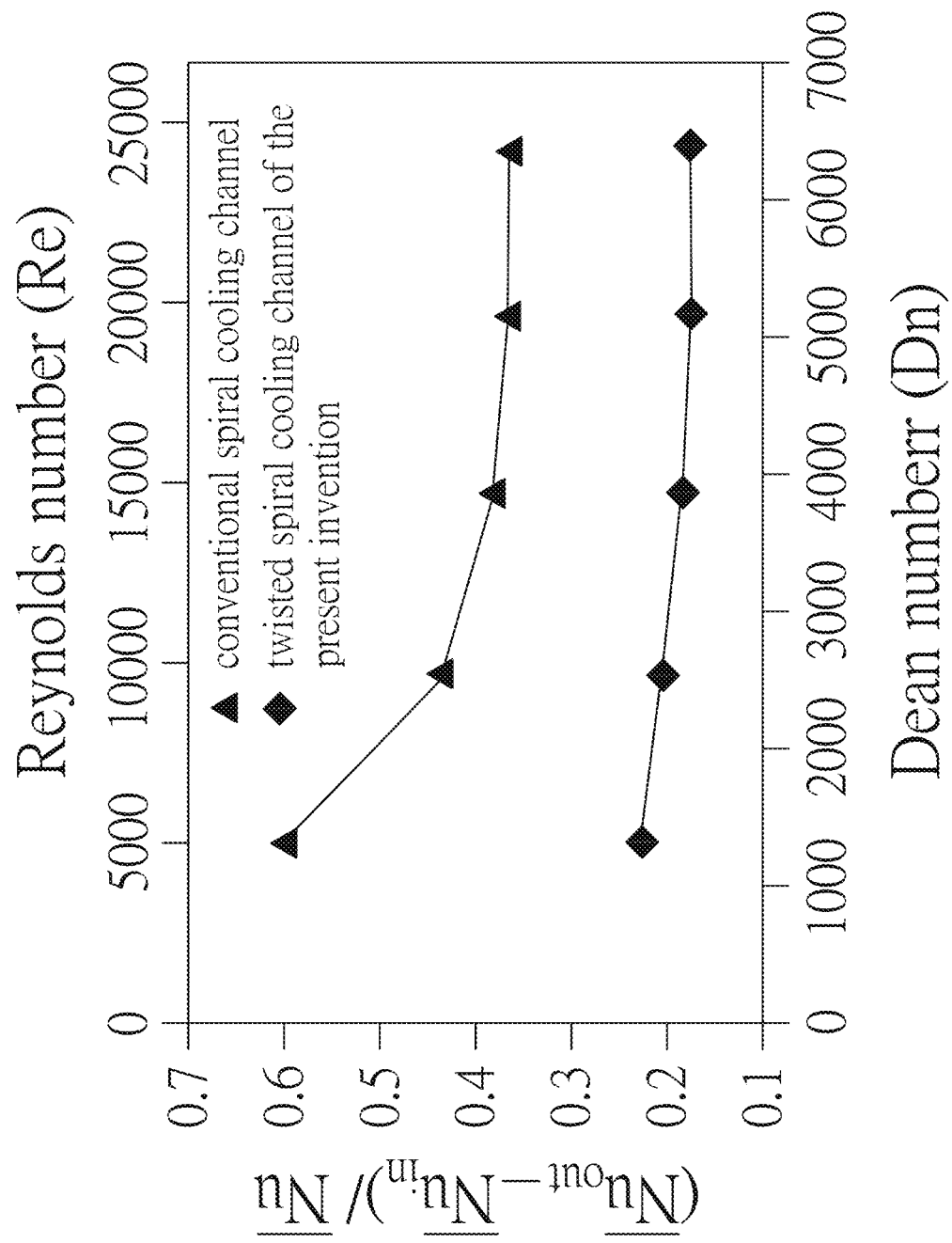
F I G. 12

MOTOR, COOLING DEVICE HAVING
TWISTED SPIRAL COOLING CHANNEL
AND COOLING METHOD

FIELD OF THE INVENTION

The present invention relates to a motor, a cooling device and a cooling method, and more particularly to a cooling device having a twisted spiral cooling channel for a cooling fluid flowing through the twisted spiral cooling channel to be subjected to the continuously changing cross-section of the twisted spiral cooling channel to form a complex secondary flow, thereby increasing turbulence intensity and vorticity and improving the convection heat dissipation efficiency.

BACKGROUND OF THE INVENTION

A motor is used for converting input power into kinetic energy output. But the conversion process will produce energy loss (such as hysteresis loss, rotation loss, stray loss). Part of this energy loss will be converted into heat, which will cause the temperature of the motor to rise. Excessive temperature will not only reduce the working efficiency of the motor and shorten the service life, but also limit the maximum power of the motor. Under the maximum load of the motor, the heat generated by the coil on the stator is about 4 times that of the rotor.

Therefore, the motor usually corporates with a heat dissipation unit to dissipate heat from the stator. For example, the motor housing uses a heat-conducting material, a water cooling unit, and so on. Regarding conventional water cooling units, for example, Taiwan Patent Publication No. I413349 discloses a water cooling structure for an electric motor, which includes a motor body, a heat dissipation base, and a spoiler. The motor body is fitted outside the heat dissipation base. The heat dissipation base has at least one main channel arranged on its outer peripheral side. The spoiler is arranged in the main channel to generate a turbulence effect on the fluid in the main channel to generate a secondary flow, thereby improving the convection heat dissipation efficiency.

However, in order to generate a secondary flow in the channel, it is necessary to additionally provide a spoiler in the channel, which increases the inconvenience in the producing process.

SUMMARY OF THE INVENTION

The primary objective of the present invention is to provide a cooling device, a motor, and a cooling method. Through a twisted spiral cooling channel having a continuously changing cross-section, the present invention enables a cooling fluid passing through the twisted spiral cooling channel to directly generate a complex secondary flow, thereby increasing turbulence intensity and vorticity.

According to one aspect of the present invention, a cooling device comprises a sleeve and a spiral duct. A wall of the sleeve has a spiral groove extending along the sleeve. The spiral duct is mounted in the spiral groove. The spiral duct has a first spiral form extending along the spiral groove and a second spiral form extending along the spiral duct. A twisted spiral cooling channel is formed in the spiral duct.

According to another aspect of the present invention, a cooling device comprises a sleeve. A wall of the sleeve has a twisted spiral cooling channel extending along the sleeve. The twisted spiral cooling channel has a first spiral form extending along the sleeve and a second spiral form extending along the twisted spiral cooling channel.

According to a further aspect of the present invention, a motor comprises a rotor, a stator, and a cooling device mounted on the stator. The rotor is inserted through the state. The cooling device comprises a sleeve and a spiral duct. A wall of the sleeve has a spiral groove extending along the sleeve. The sleeve is sleeved onto the stator. The spiral duct is mounted in the spiral groove. The spiral duct has a first spiral form extending along the spiral groove and a second spiral form extending along the spiral duct. A twisted spiral cooling channel is formed in the spiral duct.

Preferably, the sleeve and the spiral duct are made by additive manufacturing.

Preferably, the twisted spiral cooling channel has a polygonal cross-section. For example, the cross-section of the twisted spiral cooling channel is rectangular.

According to a further yet aspect of the present invention, a cooling method, comprising the steps of: providing a cooling device, a sleeve of the cooling device being sleeved onto an object, the sleeve having a spiral cooling channel thereon, the spiral cooling channel extending along a wall of the sleeve, the spiral cooling channel having an irregular cross-section along its extending direction; providing a cooling fluid to pass through the spiral cooling channel, the cooling fluid in the spiral cooling channel being affected by the irregular cross-section to form a complex secondary flow, so as to increase turbulence intensity and vorticity and improve convection heat dissipation efficiency.

Preferably, the spiral cooling channel is a twisted spiral cooling channel. The twisted spiral cooling channel has a first spiral form extending along the wall of the sleeve and a second spiral form extending along the twisted spiral cooling channel.

According to the above technical features, the following effects can be achieved:

1. The cooling fluid in the twisted spiral cooling channel is subjected to the continuously changing cross-section along the twisted spiral cooling channel to enhance the swirl intensity and augment the turbulence intensity and vorticity for promoting the convective heat transfer coefficient by 9% to 18%.

2. The cross-section of the twisted spiral cooling channel is polygonal, which is beneficial to form a complex secondary flow.

3. The cooling device with the twisted spiral cooling channel can be made by additive manufacturing, which is cost-effective.

4. The cooling device of the present invention is not only used for heat dissipation of motors, but also suitable for heat dissipation of large electromechanical devices on ships.

BRIEF DESCRIPTION OF THE DRAWINGS

FIGS. 3A to 3D are cross-sectional views of FIG. 2;
FIGS. 6A to 6D are cross-sectional views of FIG. 5.

FIG. 9 is the turbulence intensity distribution diagram of the cooling fluid in the spiral channel of the cooling device of the present invention and the spiral duct of the conventional cooling device;

FIG. 10 is the vorticity distribution diagram of the cooling fluid in the spiral channel of the cooling device of the present invention and the spiral duct of the conventional cooling device;

FIG. 11 is a diagram showing the difference of Nusselt number of the cooling fluid in the spiral channel of the cooling device of the present invention and the cooling fluid in the spiral duct of the conventional cooling device;

FIG. 12 is a diagram showing the difference in the convective heat transfer coefficient between the inner and outer wall surfaces of the cooling fluid in the twisted spiral cooling channel of the spiral duct of the cooling device of the present invention and the cooling fluid in the spiral cooling channel of the spiral duct of the conventional cooling device.

DETAILED DESCRIPTION OF THE PREFERRED EMBODIMENTS

Embodiments of the present invention will now be described, by way of example only, with reference to the accompanying drawings.

Figure 1:
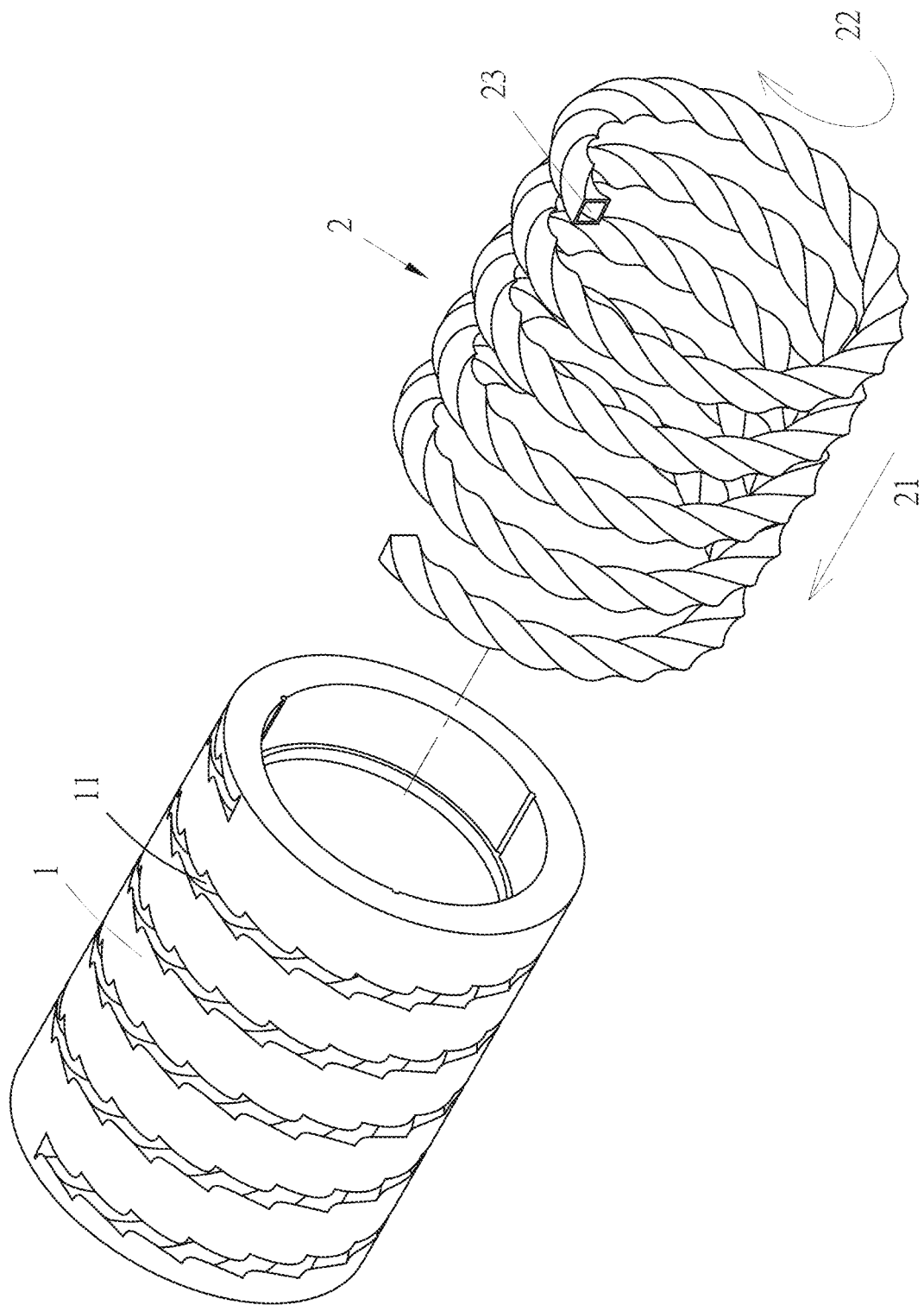
FIG. 1 is an exploded view of the cooling device of the present invention.
Figure 2:
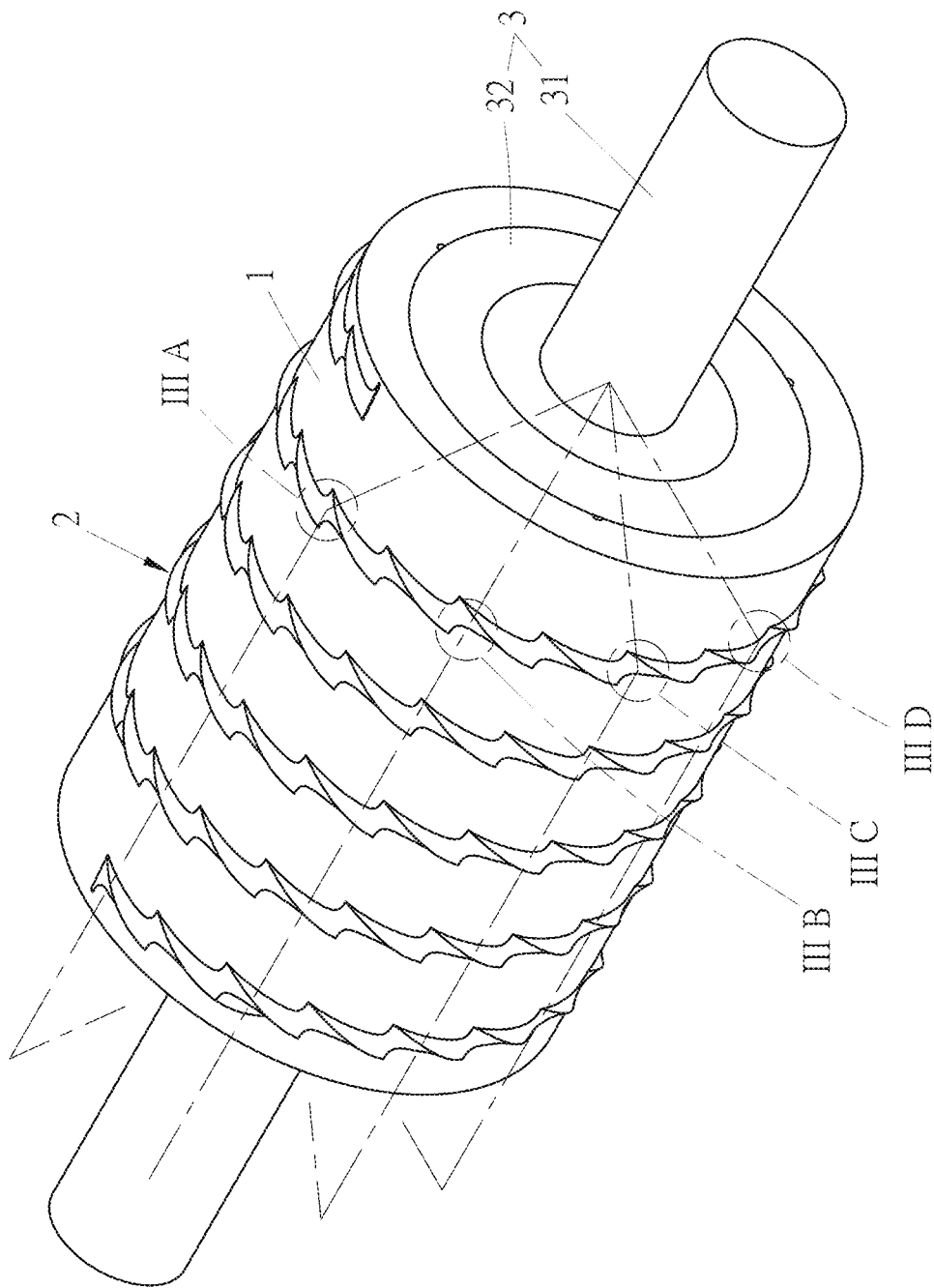
FIG. 2 is a perspective view of the cooling device of the present invention.

Referring to FIG. 1 and FIG. 2, a cooling device according to an embodiment of the present invention comprises a sleeve 1 and a spiral duct 2. The wall of the sleeve 1 has a spiral groove 11 extending along the sleeve 1. The spiral duct 2 has a first spiral form 21 extending along the spiral groove 11, so that the spiral duct 2 is correspondingly installed in the spiral groove 11. The spiral duct 2 has a second spiral form 22 extending along the spiral duct 2. A twisted spiral cooling channel 23 is formed in the spiral duct 2. Thereby, the twisted spiral cooling channel 23 has a continuously changing cross-section. The cross-section of the twisted spiral cooling channel 23 is polygonal. In this embodiment, the cross-section of the twisted spiral cooling channel 23 is rectangular. The sleeve 1 and the spiral duct 2 are made by additive manufacturing (3D printing).

Referring to FIG. 2, the cooling device is installed on a motor 3. The motor 3 has a rotor 31 and a stator 32. The sleeve 1 is sleeved onto the stator 32.

Referring to FIGS. 3A to 3D, through the second spiral form 22 of the spiral duct 2, the cross-section of the twisted spiral cooling channel 23 is continuously changing. Under different angles, the cross-section of the twisted spiral cooling channel 23 is inclined at different angles. When a cooling fluid, such as water, passes through the twisted spiral cooling channel 23, the cooling fluid is subjected to the centrifugal force along the first spiral form 21 of the spiral duct 2 and the continuously changing cross-section of the twisted spiral cooling channel 23 formed by the second spiral form 22 of the spiral duct 2 to generate a complex secondary flow, thereby increasing the turbulence intensity and vorticity and increasing the rate of heat transfer of the flow field.

Figure 4:
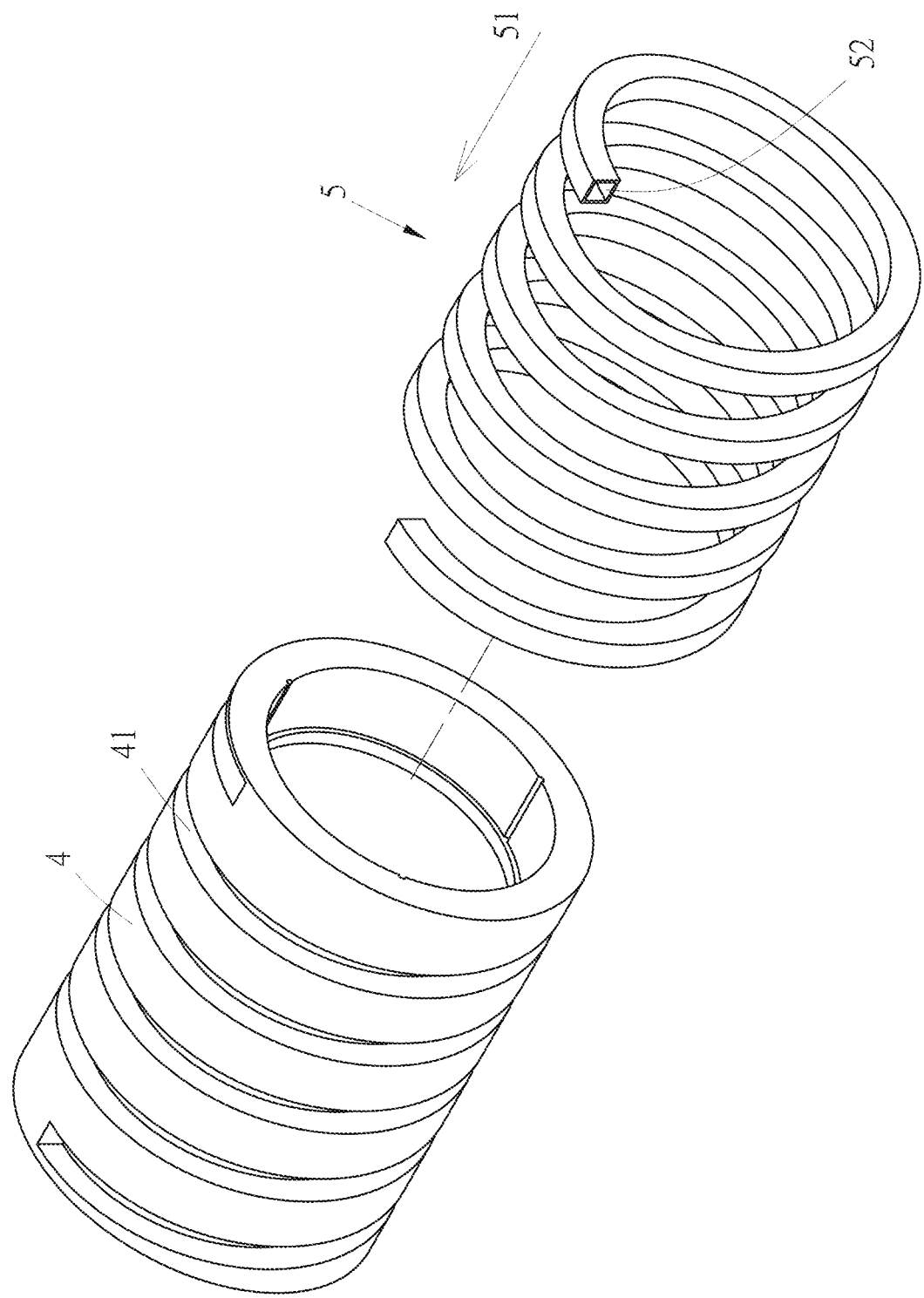
FIG. 4 is an exploded view of a conventional cooling device.
Figure 5:
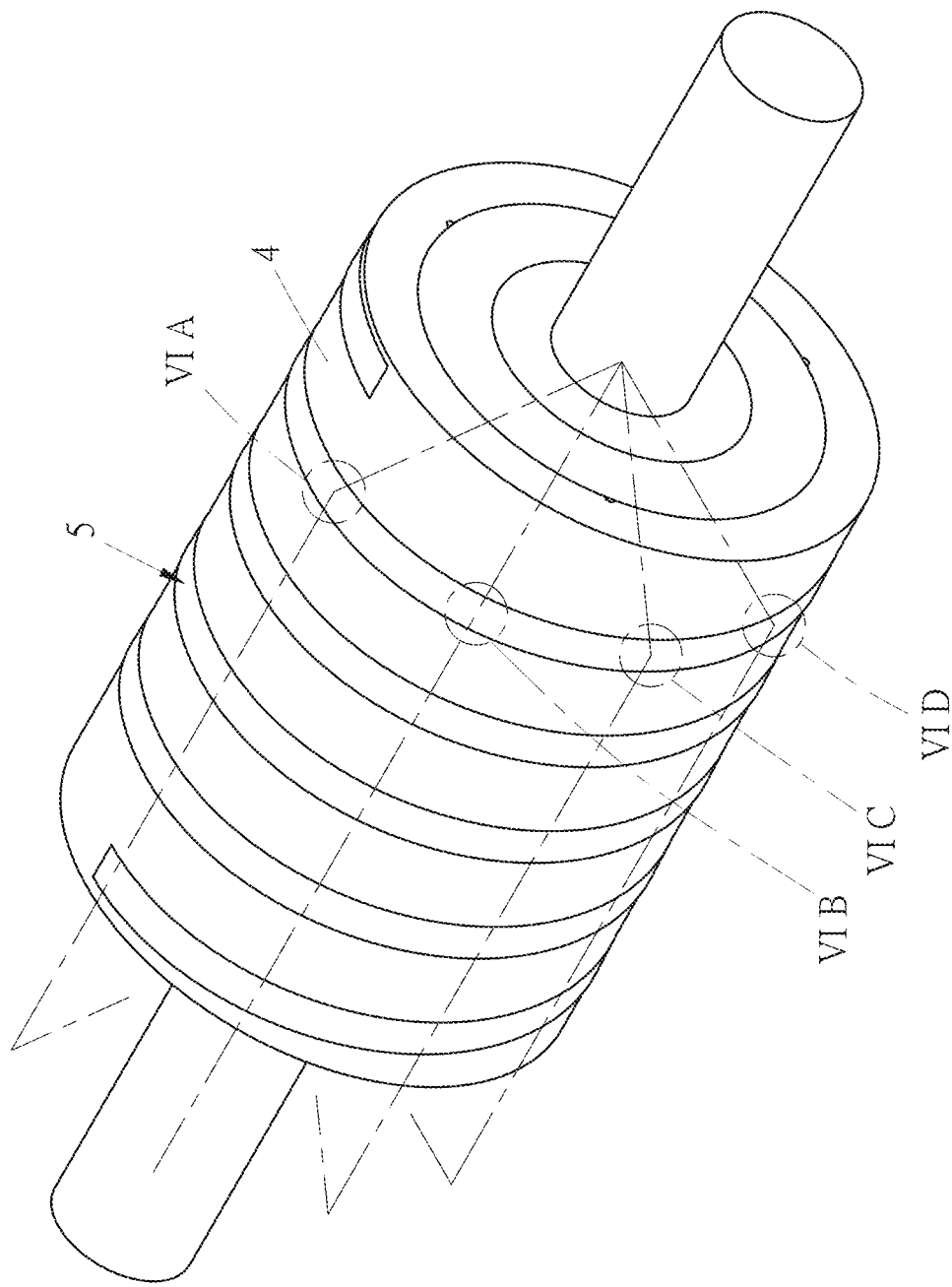
FIG. 5 is a perspective view of the conventional cooling device.

Referring to FIG. 4 and FIG. 5, in order to illustrate the cooling effect of the cooling device of this embodiment, first, the cooling device of this embodiment and the conventional cooling device with a spiral cooling channel perform numerical simulation of the flow field. The numerical simulation uses the RNGk-ε turbulence model for analysis. The conventional cooling device with a spiral cooling channel includes a sleeve 4 and a spiral duct 5. The wall of the sleeve 4 is formed with a spiral groove 41 extending along the sleeve 4. The spiral duct 5 has a spiral form 51 corresponding to the spiral groove 41, so that the spiral duct 5 is correspondingly installed in the spiral groove 41. A spiral cooling channel 52 is formed in the spiral duct 5. The spiral duct 5 is not further twisted to have the second spiral form 22 of this embodiment.

Referring to FIGS. 6A to 6D, because the spiral duct 5 is not further twisted to have the second spiral form 22 of this embodiment, the cross-section of the spiral cooling channel 52 is the same at different inclination angles. When a cooling fluid, such as water, passes through the spiral cooling channel 52, the cooling fluid is subjected to the centrifugal force along the spiral form 51 of the spiral duct 5, so that the spiral cooling channel 52 has a large difference in convective heat transfer coefficient between the inner and outer sides. In particular, the inner side of the spiral cooling channel 52 is a low heat transfer area, but the inner side is close to the heat source of the coil of the stator, which requires a higher convective heat transfer coefficient. The convective heat transfer coefficient of the inner side of the spiral cooling channel 52 belongs to the characteristic of Dean vertical flow with relatively low heat transfer rate on its inner wall. As the inner wall of a spiral coolant channel plays the most important role for transferring the heating power from the stator windings to the coolant, the inheriting low heat transfer rates on the inner wall of a smooth spiral channel weaken the cooling effectiveness of the heat dissipation system of the stator of the motor.

Figure 7:
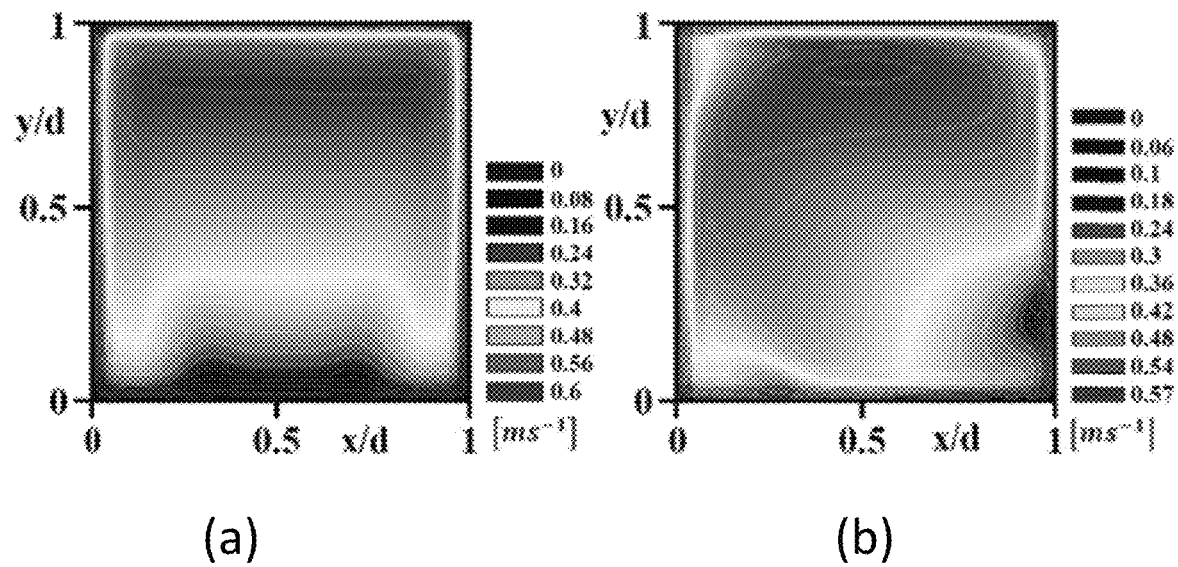
FIG. 7 is the flow velocity distribution diagram of the cooling fluid flowing along the extending direction of the spiral channel of the cooling device of the present invention and the spiral duct of the conventional cooling device.

FIG. 7 shows the flow velocity along the extending direction of the spiral duct 2 and the spiral duct 5 when the Reynolds number of the cooling fluid is 10000. In the figure, (a) is the conventional cooling device, and (b) is the cooling device of this embodiment. Wherein, there is little difference in the flow velocity of the cooling fluid along the extending direction of the spiral duct 2 and the spiral duct 5 respectively, which conforms to the law of conservation of mass. However, the flow velocity distribution of the cooling fluid in the spiral duct 5 of the conventional cooling device is relatively even. In the spiral duct 2 of the cooling device of this embodiment, the circumferential velocity component of the cross-section of the duct is greatly increased because the spiral duct 2 of the cooling device of this embodiment has a continuously changing cross-section. The torsion force of the twisted spiral cooling channel 23 of the spiral duct 2 promotes the torsion of the fluid, causing the flow velocity of the cross-section to be twisted toward the outer wall surface of the twisted spiral cooling channel 23. The outer wall surface of the twisted spiral cooling channel 23 has a higher flow velocity. Since the twisted spiral cooling channel 23 continuously exerts torsion force on the fluid, the flow velocity distribution of the cooling fluid is twisted in a counterclockwise direction, thereby forming a complex secondary flow and increasing the turbulence intensity and vorticity. Therefore, the heat dissipation rate can be increased.

Figure 8:
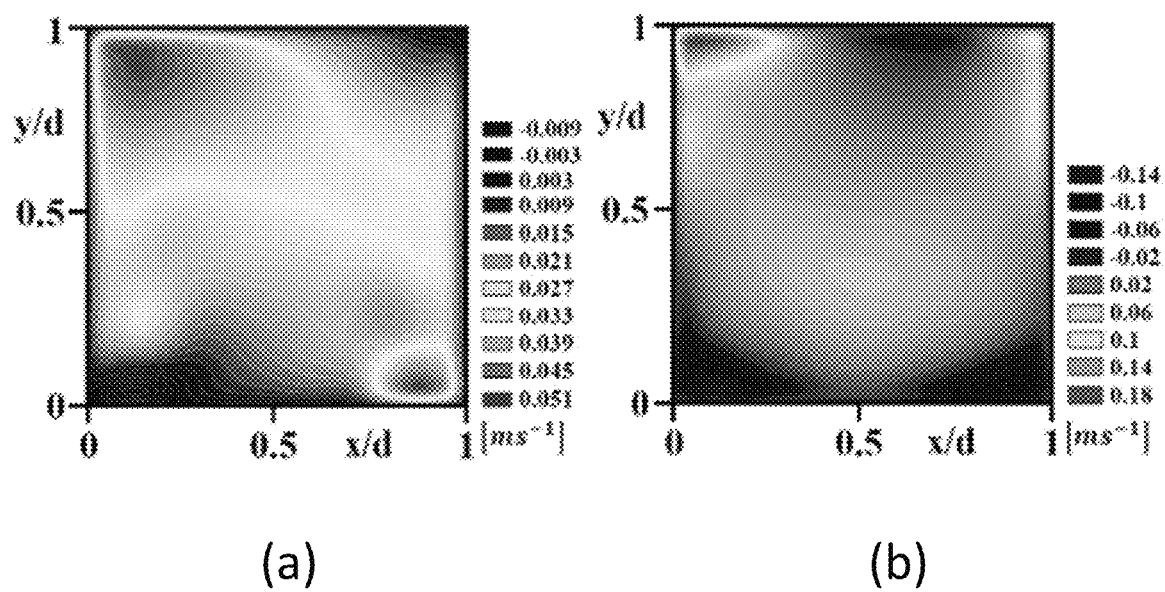
FIG. 8 is the flow velocity distribution diagram of the cooling fluid flowing along the tangential direction of the spiral channel of the cooling device of the present invention and the spiral duct of the conventional cooling device.

FIG. 8 shows the flow velocity along the tangential direction of the spiral duct 2 and the spiral duct 5 when the Reynolds number of the cooling fluid is 10000. In the figure, (a) is the conventional cooling device, and (b) is the cooling device of this embodiment. Wherein, the flow velocity of the cooling fluid along the tangential direction of the spiral duct 2 is about 5-10 times the flow velocity of the cooling fluid along the tangential direction of the spiral duct 5 because the spiral duct 2 of the cooling device of this embodiment has a continuously changing cross-section. When the cooling fluid hits the inner wall surface of the spiral duct 2, a complex secondary flow is formed, so the convection phenomenon is obvious, and the heat dissipation rate can be improved.

FIG. 9 shows the turbulence intensity of the cooling fluid in the spiral duct 2 and the spiral duct 5 when the Reynolds number of the cooling fluid is 10000. In the figure, (a) is the conventional cooling device, and (b) is the cooling device of this embodiment. Wherein, based on the shear layer guided by the secondary cross-sectional vortex strengthened by the twisted spiral cooling channel 23 of the spiral duct 2, the turbulence intensity of the cooling fluid in the twisted spiral channel 2 is about 2 to 4 times the turbulence intensity of the cooling fluid in the spiral smooth channel 5. As to the turbulence intensity distribution, in the spiral duct 5 of the conventional cooling device, the high turbulence intensity area is concentrated on the outer wall surface and both side walls of the spiral cooling channel 52 of the spiral duct 5. The turbulence intensity of the inner wall surface of the twisted spiral cooling channel 23 of the spiral duct 2 is significantly improved, which is beneficial to reduce the difference in heat transfer rates of the four wall surfaces of the twisted spiral cooling channel 23.

FIG. 10 shows the vorticity distribution of the cooling fluid in the spiral duct 2 and the spiral duct 5 when the Reynolds number of the cooling fluid is 10000. In the figure, (a) is the conventional cooling device, and (b) is the cooling device of this embodiment. Wherein, in the spiral cooling channel 52 of the spiral duct 5, the vorticity distribution is basically symmetrical to the middle axis of x/d=0.5. In the twisted spiral cooling channel 23 of the spiral duct 2, the cooling fluid is subjected to torsion force, so the vorticity distribution is twisted in the counterclockwise direction. The vorticity adjacent to the inner wall surface of the twisted spiral cooling channel 23 is significantly increased. Therefore, it is expected that convective heat transfer coefficient of the inner wall surface of the twisted spiral cooling channel 23 is significantly increased.

Based on the above numerical simulation results, the flow field distribution of the cooling fluid in the spiral duct 5 of the conventional cooling device and the spiral duct 2 of the cooling device of this embodiment is different. The convection heat dissipation efficiencies of the two are further analyzed.

Referring to FIG. 11, under different Reynolds numbers and Dean numbers, the average Nusselt number ($\overline{Nu}_{ST}$, Nu number) of the turbulence of the cooling fluid in the spiral duct 2 of the cooling device of this embodiment is divided by the average Nusselt number ($\overline{Nu}$, Nu number) of turbulence of the cooling fluid in the spiral duct 5 of the conventional cooling device. The figure shows how the ratio $\overline{Nu}_{ST}/\overline{Nu}$ changes with the Dean number (Dn) or Reynolds number (Re). Since $\overline{Nu}_{ST}$ is continuously higher than $\overline{Nu}$ obtained by the same Dn (Re) number, $\overline{Nu}_{ST}/\overline{Nu}$ is higher than 1, between 1.18-1.09, in the range of 5000<Re<25000. This means that the cooling device of this embodiment can increase the convective heat transfer coefficient by 9% to 18% compared to the conventional cooling device.

Referring to FIG. 12, when the spiral duct 2 and the spiral duct 5 are used for heat dissipation of the motor, the cooling fluid is subjected to centrifugal force, and the convective heat transfer coefficient of the inner wall surface is lower than that of the outer wall surface of the twisted spiral cooling channel 23 of the spiral duct 2 and the spiral cooling channel 52 of the spiral duct 5. The difference ratio of the convective heat transfer coefficient of the inner and outer wall surfaces is defined as $(\overline{Nu}_{out}/\overline{Nu}_{in})/\overline{Nu}$. Wherein, $\overline{Nu}_{out}$, $\overline{Nu}_{in}$ and $\overline{Nu}$ respectively represent the average convective heat transfer coefficient of the outer wall surface, the inner wall surface and each wall surface of the duct. The ratio ($\overline{Nu}_{out}/\overline{Nu}_{in})/\overline{Nu}$ of the spiral cooling channel 52 of the spiral duct 5 is between 0.6 and 0.38, which shows a large difference in heat transfer between the inner and outer wall surfaces of the spiral cooling channel 52. The ratio ($\overline{Nu}_{out}/\overline{Nu}_{in})/\overline{Nu}$ of the twisted spiral cooling channel 23 of the spiral duct 2 is about 0.18-0.22, which greatly reduces the difference in heat transfer between the inner and outer walls of the duct. In addition to improving the convective heat transfer coefficient significantly, it also effectively improves the uniformity of the convective heat transfer coefficient distribution of the duct and increases the heat transfer rate.

Through the above simulation values, it can be seen that in the present invention, the cooling fluid forms a complex secondary flow under the action of the continuously changing cross-section of the twisted spiral cooling channel, which can improve the convection heat dissipation efficiency. The cooling device of the present invention is not only used for heat dissipation of motors, but also suitable for heat dissipation of cylinder liners and cylinder heads of large diesel engines and electromechanical devices on ships.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A cooling device, comprising:
   a sleeve, a wall of the sleeve having a spiral groove formed inside the wall and extending along the sleeve;
   a spiral duct mounted in the spiral groove, the spiral duct having a first spiral form extending along the spiral groove and a second spiral form extending along the spiral duct, and
   a twisted spiral cooling channel formed in the spiral duct by walls of the spiral duct in thermal contact with the spiral groove of the sleeve, wherein the twisted spiral cooling channel has cross-sections defined by the walls of the spiral duct, and wherein orientation of the walls of the cross-sections of the twisted spiral cooling channel changes relative the sleeve along a length of the spiral duct for increasing turbulence intensity and vorticity of a cooling fluid inside the spiral duct.

2. The cooling device as claimed in claim 1, wherein the sleeve and the spiral duct are made by additive manufacturing.

3. The cooling device as claimed in claim 1, wherein the twisted spiral cooling channel has a polygonal cross-section.

4. The cooling device as claimed in claim 3, wherein the cross-section of the twisted spiral cooling channel is rectangular, square or triangular.

5. A motor, comprising:
   a rotor;
   a stator, the rotor being inserted through the state; and
   a cooling device, comprising a sleeve and a spiral duct, a wall of the sleeve having a spiral groove formed inside the wall and extending along the sleeve; the sleeve being sleeved onto the stator; the spiral duct being mounted in the spiral groove, the spiral duct having a first spiral form extending along the spiral groove and a second spiral form extending along the spiral duct, and a twisted spiral cooling channel being formed in the spiral duct by walls of the spiral duct in thermal contact with the spiral groove of the sleeve, wherein the twisted spiral cooling channel has cross-sections defined by the walls of the spiral duct, and wherein orientation of the walls of the cross-sections of the twisted spiral cooling channel changes relative the sleeve along a length of the spiral duct for increasing turbulence intensity and vorticity of a cooling fluid inside the spiral duct.

6. The motor as claimed in claim 5, wherein the sleeve and the spiral duct are made by additive manufacturing.

7. The motor as claimed in claim 5, wherein the twisted spiral cooling channel has a polygonal cross-section.

8. The motor as claimed in claim 7, wherein the cross-section of the twisted spiral cooling channel is rectangular, square of triangular.

9. A cooling method, comprising the steps of:
providing a cooling device, a sleeve of the cooling device being sleeved onto an object, the sleeve having a spiral cooling channel, the spiral cooling channel extending inside a wall of the sleeve along the sleeve, the spiral cooling channel having cross-sections formed by walls of the spiral cooling channel, wherein orientation of the walls of the cross-sections of the spiral cooling channel changes relative to the sleeve along a length of the spiral cooling channel; and
providing a cooling fluid to pass through the spiral cooling channel, the cooling fluid in the spiral cooling channel being affected by the changing orientation of the walls of the cross-sections of the spiral cooling channel along the length thereof to form a complex secondary flow, so as to increase turbulence intensity and vorticity and improve convection heat dissipation efficiency.

10. The cooling method as claimed in claim 9, wherein the spiral cooling channel is a twisted spiral cooling channel, and the twisted spiral cooling channel has a first spiral form extending along the wall of the sleeve and a second spiral form extending along the twisted spiral cooling channel.

11. A cooling device, comprising:
a sleeve, a wall of the sleeve having a twisted spiral cooling channel extending along the sleeve inside the wall of the sleeve; the twisted spiral cooling channel having a first spiral form extending along the sleeve and a second spiral form extending along the twisted spiral cooling channel, wherein the twisted spiral cooling channel is formed by walls of the spiral duct in thermal contact with the spiral groove of the sleeve, wherein the twisted spiral cooling channel has cross-sections defined by the walls of the spiral duct, and wherein orientation of the walls of the cross-sections of the twisted spiral cooling channel changes relative the sleeve along a length of the spiral duct for increasing turbulence intensity and vorticity of a cooling fluid inside the spiral duct.

* * * * *